United States Patent Office 3,522,963
Patented Aug. 4, 1970

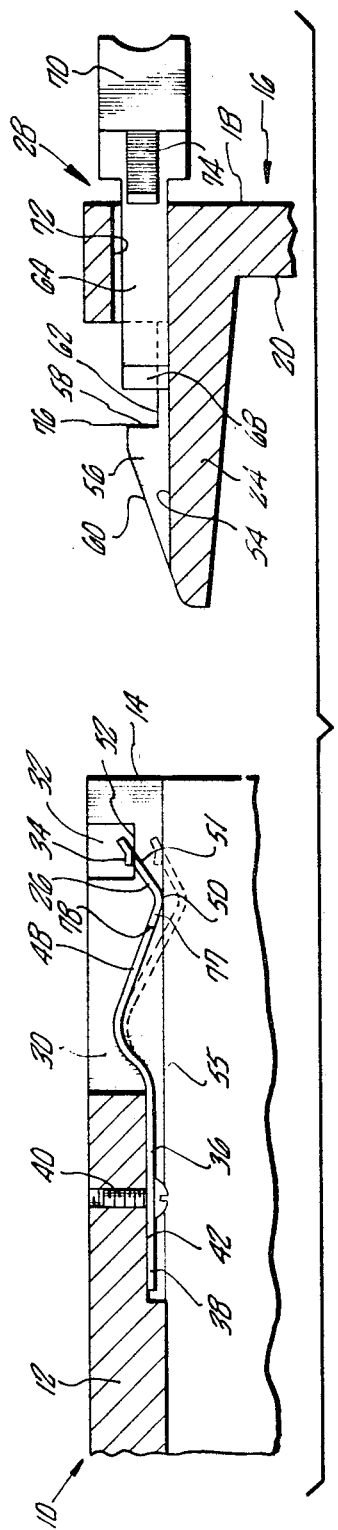

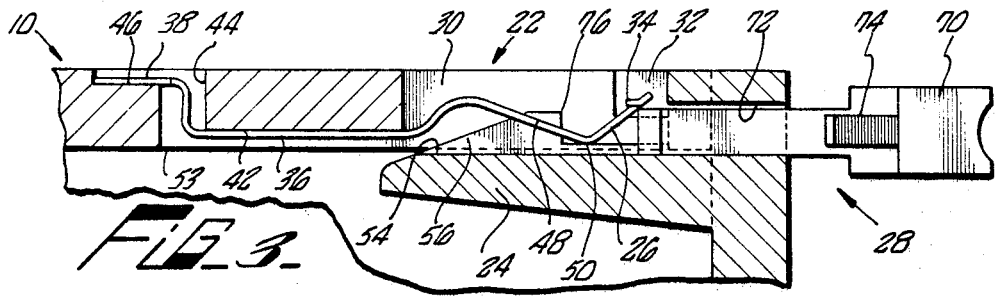
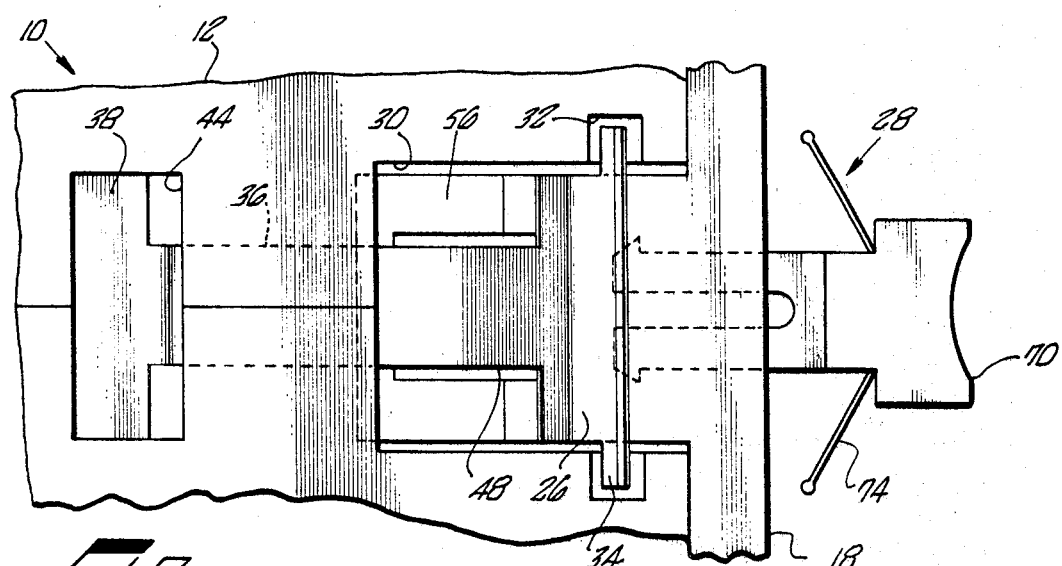
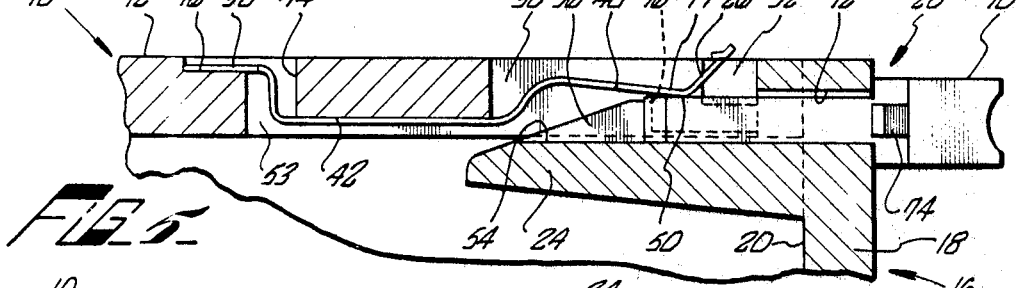
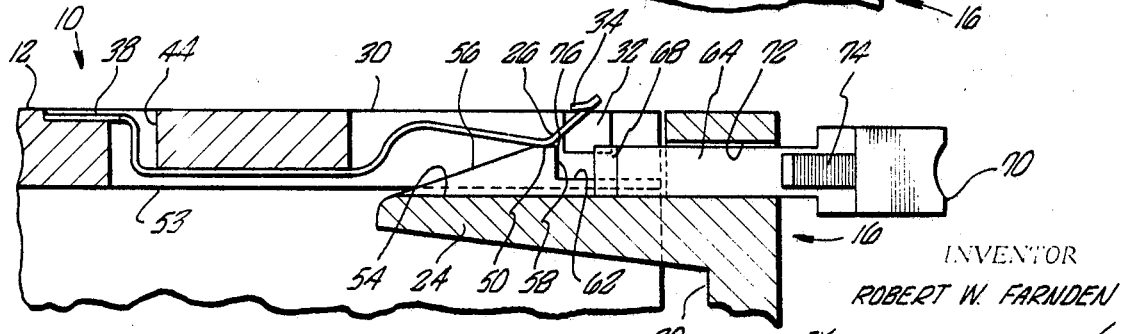

3,522,963
LATCHING MECHANISM
Robert W. Farnden, Sepulveda, Calif., assignor to Industrial Electronic Engineers, Inc., Van Nuys, Calif., a corporation of California
Filed Oct. 13, 1967, Ser. No. 675,160
Int. Cl. E05c 19/06
U.S. Cl. 292—83                                    1 Claim

ABSTRACT OF THE DISCLOSURE

A latching mechanism for releasably securing a first member to a second member. A keeper extends from the first towards the second member. A cross bar is secured to the second member and is spring biased towards the keeper into engagement with an undercut of the keeper. A push bar is disposed adjacent the keeper and the cross bar and is movable in a direction parallel to the direction in which the keeper extends. Movement of the push bar into a space intermediate the keeper and the cross bar disengages the cross bar from the undercut in the keeper and releases the first and the second member.

BACKGROUND OF THE INVENTION

Field of the invention

This invention relates to fastening devices and more particularly it relates to a latching mechanism for releasably securing a first to a second member.

State of the prior art

Latching mechanisms are used from their most common application securing a door to a frame to such industrial uses as securing covers to containers or in conjunction with fastening devices for holding two or more parts together. Principally these mechanisms all provide a keeper having one or more shoulders or undercuts and a biased member for engaging the undercuts or shoulders and retaining the two parts in a predetermined fixed position. Means are also provided for moving the keeper or the biased member relative to the other to disengage the parts and release them.

Although prior art latching mechanisms satisfactorily retain two parts in a fixed position, they require a good deal of space which is not always available. In normal applications, such as for securing a door to a frame, whether it be a household door, an automobile door, or any other kind of door, space limitations do not play a major role. In most other applications the latching mechanisms are applied exteriorily of the parts to be secured to each other to again avoid the problem of space limitations in the design and construction of the mechanisms.

If a latching mechanism must be installed in a limited space, particularly where the depth of the space is relatively small, prior art latching mechanisms are unsatisfactory because they cannot be installed in the available space. The main reason for their bulkiness is that the means for releasing the engaging members of the mechanism require rotatable or pivotable handles which must protrude past the space occupied by these members. It is therefore practically impossible to adapt prior art latching mechanisms for use in shallow spaces unless the mechanism is constructed substantially more complicated and therefore more costly. As a consequence bolts and nuts are often used to secure two members to each other in applications where a quick release latching mechanism is highly desirable.

The release bar or handle of prior art latching mechanisms must be subjected to an actuating force until the members are disengaged. In many applications this is difficult or impossible to do since an operator must simultaneously move one of the members away from the other.

SUMMARY OF THE INVENTION

The present invention provides a latching mechanism adapted to be disposed in shallow spaces for releasably retaining a first and a second member in a particular relationship with respect to each other. Briefly, the latching mechanism includes a keeper having an undercut which is connected with the first member and projects towards the second member. Spring means are secured to the second member and define a cross bar for retaining the first and the second members in the particular relationship when the cross bar is disposed in the undercut. A push bar is axially movable in a direction parallel to the direction in which the keeper projects and is disposed adjacent a side of the keeper proximate to the spring means. An end of the push bar is adjacent the cross bar and another end extends past the exterior of one of the members such that the push bar disengages the spring means from the undercut when it is moved axially towards the cross bar.

Preferably, the spring means include an elongated leaf spring having one end secured to the second member and the other end integrally constructed with the cross bar. The push bar is preferably disposed in an aperture of the first member and is constructed such that its axial movement is limited in both directions to prevent it from becoming disengaged from the first member and lost. The cross bar is given a configuration such that it biases the push bar in a direction away from it when the cross bar and the undercut are in engagement.

When the push bar is axially moved towards the cross bar an increasingly greater force is required until such time as the cross bar and the undercut are disengaged. At that point the force required to move the push bar in an axial direction decreases substantially. The resulting "snap action" conveniently communicates to the operator that the latching mechanism has been released. Moreover, the latching mechanism remains in a released position. The operator can disengage the members without having to continue to apply a releasing force to the push bar. The operation of the latching mechanism is thereby greatly enhanced.

Thereafter, the first and second members can be moved relative to each other. When the members are moved towards each other, the cross bar automatically engages the undercut and the keeper thereby retaining the first member and the second member in the fixed position. It is not necessary to turn handles or set push bars as was frequently the case in prior art latching mechanisms, since the cross bar automatically biases the push bar away from it when the members are moved towards each other.

A latching mechanism constructed in accordance with the present invention is adapted to be installed in shallow spaces since all component parts are substantially aligned with each other and do not project transversely to the direction of the relative movement between the first and the second member to be secured to each other. Therefore, it is ideally adapted for applications having space limitations. One such application is common encountered when a plate must be secured to substantially transversely extending walls of a container or conduit and wherein the latching mechanism is not permitted to protrude past the walls in either its released or engaged position. Prior art latching mechanisms were not adapted for such applications and a variety of undesirable compromises were therefore necessary. For example, the use of a latching mechanism frequently had to be sacrificed because of the space limitations in favor of permanent fastening devices such as bolts. Permanent fastening devices, of course, do not exhibit the desired quick release action and are burdensome and time consuming to apply.

The latching mechanism constructed according to this invention comprises no more than three parts. All of the parts have a simple configuration and are adapted to be mass-produced. The cost of the latching mechanism is therefore held to a minimum and is substantially less than the cost of the relatively complicated prior art latching mechanism.

BRIEF DESCRIPTION OF THE DRAWINGS

FIG. 1 is a fragmentary elevational view, in section, of a latching mechanism constructed in accordance with the present invention wherein the members to be secured to each other are disengaged;

FIG. 2 is a top view of FIG. 1;

FIG. 3 is a fragmentary sectional view similar to FIG. 1 wherein the first and second members are retained in a fixed position by the latching mechanism;

FIG. 4 is a fragmentary top view similar to FIG. 2 of the arrangement shown in FIG. 3;

FIG. 5 is a fragmentary elevational view, in section, similar to FIG. 3 wherein the latching mechanism is disengaged; and FIG. 6 is a fragmentary elevational view, in section, similar to FIG. 5 wherein the first and second members are partially moved away from their fixed position and the latching mechanism is disengaged.

DESCRIPTION OF THE PREFERRED EMBODIMENTS

Referring to FIGS. 1 and 2, a first member 10 which, for example, may be a cylindrical or prismatic container (not shown), has side walls 12 and an end 14. A second member or cover 16 defined by a flat disc 18 having a periphery corresponding to an outline of the container is releasably secured to walls 12 of the container such that a side 20 abuts the end 14 (shown in FIGS. 3 and 5).

A latching mechanism 22 is provided to releasably secure the cover to the container. The latching mechanism includes a keeper 24 secured to the cover and projecting axially towards the container, a cross bar 26 secured to the container and biased towards the keeper, and a push bar or release button 28 for releasing the latching mechanism and enabling the disengagement of the cover from the walls 12 of the container.

Referring to FIGS. 2 and 4, the walls 12 of the container include a substantially rectangular cutout 30 having a width slightly greater than a length of the cross bar 26 and a pair of indentations 32 adjacent ends of the cross bar for engaging fingers 34 secured to ends of the cross bar. The cross bar is integrally constructed with an elongated leaf spring 36 which has an end 38 remote from the cross bar 26 secured to the wall 12 by means of a fastener such as a machine screw 40 threadably engaging the wall. An inner side 42 of the wall immediately adjacent the cutout 30 is recessed (shown in FIG. 1) such that the leaf spring 36 does not protrude past the wall. Alternatively, especially if the side wall 12 is split about a center of the rectangular cutout 30, the end 38 of the leaf spring is Z-shaped (see FIG. 3) and projects outwardly through an aperture 44 in the wall 12 and there engages a recessed outer surface 46. The leaf spring is thereby secured to the side walls without the need for a fastener such as the machine screw 40 shown in FIG. 1.

Referring to FIGS. 1 and 3, a portion 48 of the leaf spring adjacent the cross bar 26 is arcuately shaped and projects outwardly into the rectangular cutout 30. Its end, together with a portion of the cross bar immediately adjacent the end of the leaf spring, is angularly inclined relative to the side wall 12 which inclination ends in an arcuately shaped contact surface 50 of the cross bar. A remaining end portion 51 of the cross bar is angularly inclined relative to the side wall and opens in the direction towards the end 14 of the container.

The fingers 34 projecting from the ends of the cross bar are parallel to the side wall, therefore angularly inclined relative ot the end portion of the cross bar, and, when the latching mechanism 22 is released, engage a bottom 52 of the indentations 32. The angularly inclined end portion of the cross bar is of a sufficient length to align the contact surface 50 with an inner end 53 of side wall 12 when the fingers 34 engage the bottom 52, as best seen in FIG. 1.

Referring to FIGS. 1–4, the keeper 24 projects from side 20 of the cover 16 towards the container 10 and preferably has a length about equal to the length of the rectangular cutout 30 in the side wall 12. The keeper has a width which is slightly least than the width of the cutout 30 to enable portions of it to project into the cutout and includes a planar surface 54 which is substantially parallel to the inner side 53 and recessed from the periphery of the cover 16 an amount slightly more than the thickness of the side wall 12. When the cover and the container are secured to each other, as seen in FIG. 3, the planar surface 54 is slightly spaced apart from the inner side 53 of the wall.

A pair of laterally spaced noses 56 project from the planar surface 54 towards the side wall 12 and define engaging surfaces 58 which are transverse to the planar surface 54 and face towards the side 20 of the cover 16. The noses taper from the engaging surfaces towards the end of the keeper remote from the side 20 of the cover 16 and define angularly inclined surfaces 60. Portions 62 of the planar surface intermediate the engaging surfaces 58 and side 20 of the cover are raised relative to portions of the planar surface intermediate the noses such that they project past the inner sides 53 of side wall 12 when the cover and the container are secured to each other. In that position, shown in FIG. 3, the contact surface 50 of the cross bar 26 is in engagement with the raised portions 62 of the planar surface 54 which biases the fingers 34 away from the bottom 52 of the indentations 32.

Referring to FIG. 2, the push bar 28 includes an elongated center portion 64 which is preferably split and defines a pair of laterally spaced legs 66 disposed adjacent the planar surface 54 of the keeper 24. A protrusion 68 projects outwardly adjacent ends of the legs remote from the side 20 of the cover 16 and an enlarged head 70 is integrally constructed with the legs and is disposed exteriorly of the cover. The center portion extends through an elongated aperture 72 in the cover which is aligned with the planar surface 54 and the protrusions 68 project outwardly an amount sufficient to prevent axial movement of the push bar in a direction away from the container 10 when the protrusions are adjacent the sides 20 of the cover. A pair of outwardly extending leaf springs 74 are preferably integrally constructed with the push bar and bias the push bar in a direction away from the container 10 to position the ends of the center portion intermediate the side 20 of the cover and the engaging surfaces 58 of the noses 56. The center portion 64 of the push bar is of a sufficient length to enable axial movement of the push bar in a direction toward the cover past the contact surface 50 of the cross bar 26 when the cover and the container are engaged as shown in FIG. 3. The push bar can be removed from the aperture 72 by moving the flexible legs toward each other. The protrusions 68 are thereby aligned with the aperture and the push bar can be removed therefrom.

Turning to the operation of the latching mechanism and referring to FIGS. 3, 5 and 6, the cover 16 is moved axially towards the container 10 until side 20 of the cover is in abutment with the end 14 of the container. During this axial movement the angular surfaces 60 of the noses 56 engage the contact surface 50 of the cross bar and move the cross bar together with the leaf spring 36 outwardly relative to the side walls 12. The outward movement continues until the contact surface of the cross bar is adjacent the engaging surfaces 58 of the noses and, up to that point, requires an increasing force. Upon engagement of the contact surface with an edge 76 of the nose an oppositely inclined portion 77 of the cross bar engages the edge 76. The spring force from leaf spring 36 thereby exerts an axial force onto the cover which moves the cover into abutment with the end 14 of the container. The force required to move the cover into the abutment with the end of the container thereby decreases rapidly and a "snap action" which signals to the operator that the cover and the container are closed, or closely adjacent, is obtained. When the side 20 of the cover and the end 14 of the container are in abutment sides 78 of cross bar are substantially aligned with the engaging surfaces 58 of the noses 56. The leaf spring, therefore moves the cross bar towards the keeper until the contact surface 50 is in engagement with the raised portions 62 of the planar surface 54. See FIG. 3. The fingers 34 are disengaged from the bottom 52 of the indentations 32 and the cover is prevented from being moved in an axial direction. The cover and the container are now secured to each other by the latching mechanism 22.

During the axial movement of the cover towards the container, the leaf springs 74 bias the push bar 28 away from container 12 and prevent its ends from becoming engaged by the end portion 51 of the cross bar 26. When the side 78 of the cross bar moves past the engaging surfaces 58 of the noses 56 and the cross bar is biased towards the raised surfaces 60 the ends of the push bar adjacent the protrusions 68 are engaged by the inclined portion of the cross bar and the push bar is biased further away from the cross bar. While the cover and the container are secured to each other, the protrusions of the push bar are disposed in the space between the end portion 51 of the cross bar and the side 20 of the cover.

To release the latching mechanism, an axial force in a direction towards the cover and the container is applied to the head 70 of the push bar 28. The other end of the push bar thereby engages the angularly inclined end portion 51 of the cross bar 26 and biases the cross bar in opposition to the force exerted by leaf spring 36 away from the raised surfaces 62 of the keeper. When the head engages the cover, the push bar has travelled past the contact surface 50 of the cross bar 26. The axial force required to move the push bar towards the contact surface increases progressively until the ends are adjacent the contact surface. At that point, since the cross bar and the leaf springs do no longer move in a direction opposite to the force exerted by the leaf spring, the axial force to continue the movement of the push bar decreases rapidly. This results in a "snap action" and signals to the operator that the cross bar 26 and the noses 56 of the keeper 24 are disengaged as shown in FIG. 5. The push bar remains in its releasing position without having to apply any axial force to the head 70 and the cover is free to be moved axially in a direction away from the container 10. This movement is aided by the leaf spring 36 and the cross bar 26 since engagement of the contact surface 50 with the angular surfaces 60 of the noses 56 results in an axial force biasing the cover away from the container. Removal of the cover from the container is thereby facilitated. This is particularly desirable in instances where the cover is not provided with a handle and is relatively thin such that it is difficult for an operator to grasp it with his fingers.

The use of the latching mechanism described above is, of course, not limited to its use in conjunction with a container and a cover that is to be secured to it. It can be employed with any structural member that is to be secured to another member, irrespective whether or not the two members pivot relatively to each other, or are linearly movable as the above described cover is relative to the container. Moreover, the latching mechanism can be altered to suit particular applications. For example, the keeper 24 can be provided with a plurality of axially spaced noses 56 and engaging surfaces 58 such that the cross bar 26 engages the surfaces in a plurality of possible relative positions between the cover and the container. This is frequently desirable where there are no fixed stops such as side 20 of the cover in the above described embodiment, and where the exact relative position between the members cannot be determined in advance. Such a latching mechanism, however, operates in the same manner as does the preferred embodiment of this invention and enables the realization of the same advantages.

What is claimed is:

1. Apparatus for releasably securing a cover to a body having an axis and walls disposed transversely to the cover and parallel to the axis, the apparatus comprising:
   an axially disposed keeper having a side facing a wall of the body which is substantially parallel to that wall and a projection from the keeper defining an engaging surface positioned substantially transversely to said wall intermediate the cover and an end of the keeper;
   a leaf spring defining a cross bar secured to the body in an orientation parallel to the axis of the body, the cross bar being biased toward and into engagement with the engaging surface of the keeper; and
   release means including an axially movable push bar movable intermediate the cross bar and the keeper to move the cross bar out of engagement with the keeper, the cross bar and push bar being arranged such that the push bar is biased in a direction away from the cross bar when the cross bar and keeper are in engagement, the cross bar and keeper defining an axially oriented acute angle, the push bar being disposed in an aperture in the cover and including a head at one end projecting past the cover having a cross section greater than the cross section of the aperture and a pair of laterally spaced flexible legs at the opposite end, at least one of said legs including a projection to prevent it from being removed from the aperture until the legs are moved toward each other, the push bar having a length sufficient to move it in an axial direction past the portion of the cross bar defining the acute angle.

References Cited

UNITED STATES PATENTS

| 194,166   | 8/1877 | Newbrough | 292—81  |
| 195,117   | 9/1877 | Frankel   | 292—83  |
| 848,515   | 3/1907 | Tysinger  | 292—83  |
| 1,185,422 | 5/1916 | Mammelli  | 292—227 |
| 1,460,409 | 7/1923 | Dochnal   | 249—24  |
| 2,507,511 | 5/1950 | Freidag et al. | 292—19 |

FOREIGN PATENTS 1,239,267   7/1960   France.

RICHARD E. MOORE, Primary Examiner

R. L. WOLFE, Assistant Examiner

U.S. Cl. X.R.

292—86, 254